United States Patent Office 3,304,448
Patented Feb. 14, 1967

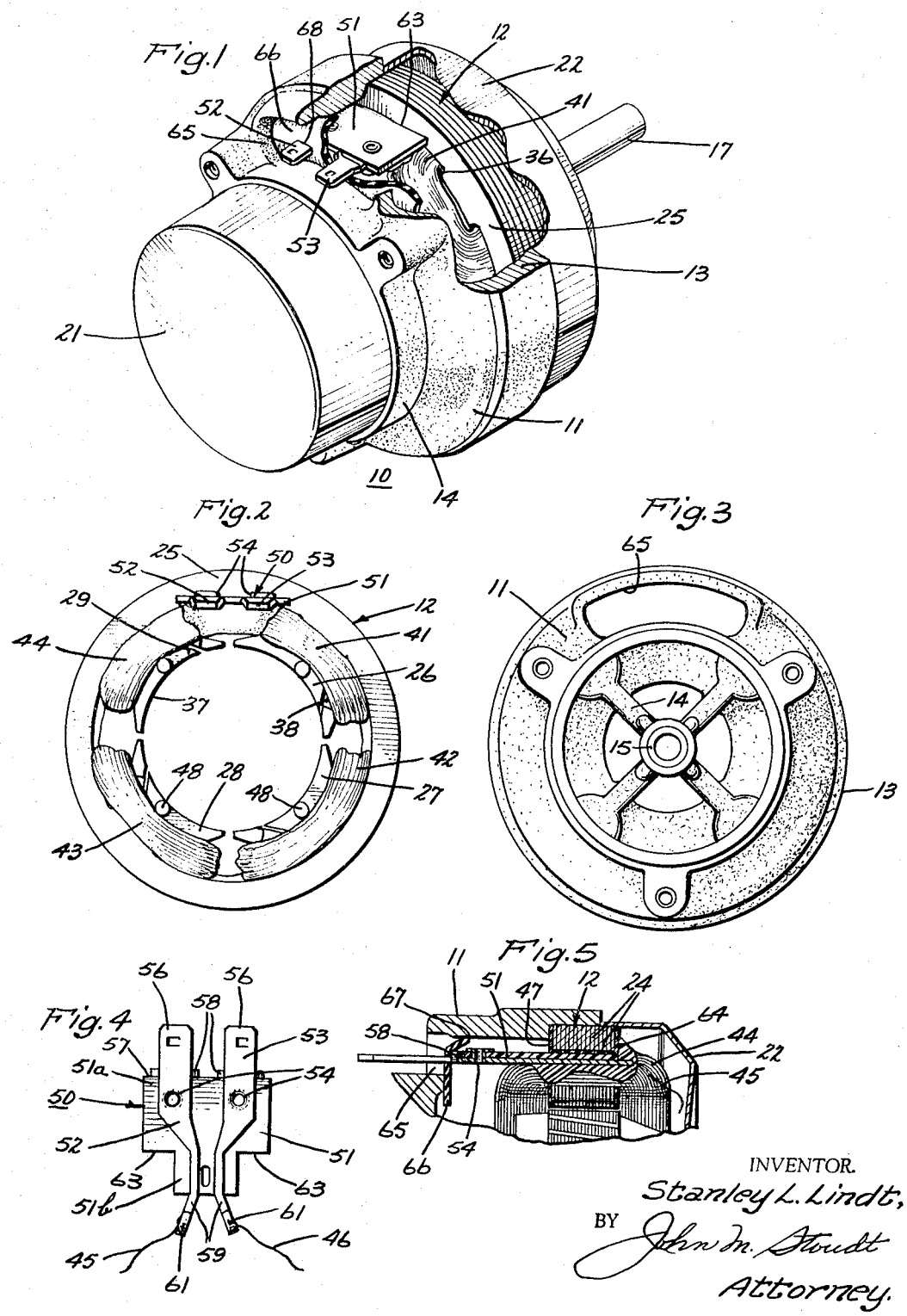

3,304,448
DYNAMOELECTRIC MACHINE TERMINAL
ARRANGEMENT
Stanley L. Lindt, Fort Wayne, Ind., assignor to General
Electric Company, a corporation of New York
Filed Apr. 24, 1964, Ser. No. 362,225
3 Claims. (Cl. 310—71)

This invention relates generally to electrical apparatus such as dynamoelectric machines and more specifically to an improved terminal arrangement for small electric motors.

Electric apparatus, such as fractional and small horsepower electric motors, incorporate some kind of terminal arrangement for connecting internal electrical components; e.g., excitation windings, to external conductors which in turn can be attached to a suitable source of electric power. It is extremely desirable to provide a terminal arrangement which permits ease and swiftness in making outside connections with the power source so that the internal electrical components of the motor may readily be tested after they have been assembled without causing injury either to the terminals themselves or to the electrical motor components. For instance, considerable difficulty has been experienced in attaching the winding ends to terminals and thereafter assembling the terminals in a relatively stationary position with respect to the stator or motor frame such that subsequent handling will not adversely affect the quality of the electrical or the mechanical characteristics of the connection.

It is further desirable to provide a terminal arrangement which is inexpensive to manufacture, may be easily and economically installed onto the motor, does not require an increase in the size of the motor, and at the same time, is readily accessible to a location external to the motor frame for quick connection to a suitable power source.

It is therefore a general object of the present invention to provide an improved terminal arrangement in electrical apparatus and it is a more specific object to provide a dynamoelectric machine with a terminal arrangement having the desirable features described above.

It is a further object of this invention to provide a stator with a terminal assembly of relatively simple construction which is economical to manufacture, readily installed onto the stator and firmly held thereon, and is capable of quick connection and disconnection with an external source of power.

In carrying out the objects of this invention in one form, I provide an improved dynamoelectric machine, such as a small electric motor, having a stator arranged within a frame formed with an opening in direct communication between the stator and a location outside the frame. A terminal assembly, having a sheet of electrical insulating material and a pair of spaced apart terminal elements fixedly mounted on the surface of the sheet, is rigidly secured to the stator. The insulating sheet of the assembly includes a section of reduced width which is accommodated in a slot of the stator for properly positioning the assembly in the frame. The winding carried by the stator and the terminal elements are electrically connected together. Each of the terminal elements terminates in a male quick-connect terminal portion, extending away from the stator beyond the edge of the sheet. A resilient piece is fitted between the frame and an edge of the insulating sheet, in engagement with the terminal assembly, with the male terminal portions projecting through the piece and into the opening of the frame for quick connection with external connectors of a power source. The resilient piece serves to seal the opening as well as to urge the terminal assembly toward the stator for augmenting the resistance of the assembly to movement away from its position on the stator as the external connectors are being removed from the terminal portions of the assembly. With the terminal arrangement of this invention, it is possible to obtain the desirable features mentioned above at a relatively low cost.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a view in perspective, partly broken away, of a small dynamoelectric machine incorporating the preferred form of the present invention;

FIG. 2 is an end view of the stator seen in FIG. 1;

FIG. 3 is an end view of the external side of the end frame casting shown in FIG. 1;

FIG. 4 is a bottom view of the terminal board assembly seen assembled to the stator in FIGS. 1 and 2; and FIG. 5 is a partial view, in cross section, of the dynamoelectric machine illustrated in FIG. 1 to show details.

Referring now to the drawing in more detail, the preferred form of the present invention is shown as being incorporated in a small dynamoelectric machine 10 of the general type known as a unit-bearing motor, disclosed in Patent 2,522,985, which issued to H. C. Bradley and is assigned to the same assignee as the instant invention. The motor is furnished with a stationary frame 11, formed of cast iron or die cast aluminum material, which mounts a stator 12 (to be described more fully hereinafter) within a cavity provided by an axially extending cylindrical section 13. The frame also has a web and hub section 14, cast integral with section 13, which securely mounts an elongated sleeve type bearing 15 which, in turn, rotatably supports a shaft 17 having an output end projecting beyond the confines of the frame.

A rotor 18 is carried by the shaft centrally of stator 12 and is built of laminated magnetic material provided with a squirrel cage type secondary winding of conventional design 19. For furnishing proper lubrication for the bearing, a suitable arrangement may be provided such as that revealed in the aforementioned Bradley patent. In addition, suitable cup shaped sheet metal covers 21 and 22 of standard construction may be used to enclose the rotor and stator within the confines of the cast frame 11 as best seen in FIG. 1 to provide a so-called totally enclosed housing for the internal components of the illustrated motor. Cover 22 includes a central opening (not shown) for permitting the output end of shaft 17 to extend axially beyond the interior of the motor.

Turning now more specifically to a description of the illustrated stator 12, it is constructed with a core made of a plurality of stacked laminations 24 in the manner disclosed in M. V. De Jean's United States Patent No. 3,030,528 which is also assigned to the same assignee of the present invention.

The core is of the shaded pole type, having an annular yoke section 25 and angularly spaced apart integral teeth or salient polar projections 26, 27, 28, and 29 arranged inwardly of the yoke section, defining respectively enlarged winding accommodating slots 31, 32, 33, and 34 between adjacent poles. The poles have neck portions 36 projecting inwardly from section 25, with angularly enlarged tip portions 37 terminating in arcuate shaped edges which together form a rotor receiving bore. Each polar projection has a portion of the tip encircled by non-magnetic shading rings 38 such as copper arranged in suitably provided notches in the usual way. The rings form shading coils to accomplish the well-known shading effect in the encircled part of the pole projection.

The winding slots extend entirely through the stack and accommodate the sides of winding coils 41, 42, 43, and 44, wound around the neck portions of the respective salient projections. The coils are wound from a continuous length of suitably enameled wire, with the coils forming a four pole excitation winding having free ends 45, 46 and a predetermined number of turns arranged around each polar projection. For insulating each coil from the projections, an integral and hardened layer 47 of an adhesive electrical insulating material; e.g., thermoresponsive epoxy resin, may be applied to the walls of the slots, as well as the end faces of the core. Elongated winding pins 49 of molded plastic material extend through the core and axially beyond each polar projection adjacent the bore, serving to retain the end turns of the individual coils away from and out of interference with the rotor and other rotating parts of the motor.

In accordance with the preferred embodiment of the invention, the excitation winding of the motor of the exemplification is adapted to be connected to an external power source (not shown) by a low cost terminal assembly, generally denoted by numeral 50, which is firmly mounted to stator 12. The assembly, in the preferred form, includes a generally planar insulating support member 51, having an enlarged section 51a and a section 51b of reduced width, fabricated from a sheet of electrical insulating material such as a fiber board or any other suitable electrical insulation; e.g., thermosetting plastic material or mica. Section 51a of insulating member 51 carries a pair of spaced apart mirror image elongated terminal elements 52 and 53, each attached to the lower surface of member 51 (as viewed in the drawing), as by an extruded rivet 54 or the like, stamped into the elements intermediate their ends, which projects transversely through the sheet member and is peened over against the upper surface of that member. As assembled, the terminal elements each terminate at one end in a male quick-connect terminal portion 56 of standard design which extends beyond edge 57 of the insulating member. Transverse tabs or tangs 58, formed integral with male portions 56 at their base on both sides thereof adjacent edge 57, are bent toward and into engagement with edge 57 of member 51. These tangs prevent lateral or relative angular movement between the individual terminal elements and insulating member 51. Thus, male terminal portions 56 are adapted to receive conventional quick-connect female terminal connectors attached to the end of power leads (not shown) which may be easily connected and disconnected without adversely affecting the rigidity of the securement between the terminal elements and support member 51 of the terminal assembly.

Terminal elements 52 and 53 may be stamped from any suitable electrical conducting material such as copper into the desired shape with their ends 59 remote from male portions 56 preferably being smaller in width than portions 56. As best seen in FIG. 4, when the terminal elements have been mounted to member 51, it is preferred that ends 59 project beyond the back edge of reduced section 51b, the ends being bent generally away from one another to insure their separation. Thus, prior to the installation of assembly 50 onto the stator, the free ends 45 and 46 of the winding may be readily joined respectively to terminal ends 59 of assembly 50 shown in FIG. 4 by solder or other suitable means, indicated at 61.

The manner in which terminal assembly 50 of FIG. 4 is installed and mounted to stator 12 after it has been electrically connected to winding ends 45 and 46, but before the stator is assembled within the frame, will now be considered. Insulating section 51b of reduced width is inserted into the winding slot of the core, in the space between coils 41 and 44 adjacent the yoke section, such that its sides frictionally engage the coil sides and a part of the slot wall. Further, the surface of member 51 carrying the terminal elements 52 and 53 is disposed away from the yoke of the stator to insure electrical separation of the elements from the core. Shoulder 63 of member 51, defined by an edge of enlarged section 51a on either side of reduced section 51b where the sections are joined, is in engagement with the insulated side face of the stator core yoke thereby serving to limit or control the axial position of the terminal assembly relative to the stator.

To augment the holding action between the stator and assembly 50, thermoresponsive adhesive material 64, such as thermosetting epoxy resin, may be applied in an unhardened state to cover the exposed parts of the terminal elements lying on support member 51 as well as their soldered connection with the winding and the adjacent parts of the coils and slot walls. When material 64 is subsequently hardened or cured, the arrangement not only augments the securement of the terminal assembly 50 and the stator together, but also electrically insulates the covered portion of the terminal elements. In addition, the soldered connections between the winding and elements are protected against damage which might otherwise occur from handling of the stator during subsequent assembly operations when the stator is being assembled within the frame. Once the stator 12 and assembly 50 have been assembled together to produce a structure seen in FIG. 2, the unit may be mounted within the frame of FIG. 3 and the other motor components previously described may be added.

It should be noted at this time from FIGS. 1 and 5 that with stator 12 properly arranged within the frame cavity, male terminal portions project axially away from the side face 47 of the stator core and through an angularly flanged opening 65 furnished in the frame which is in direct communication between the outside of the frame and the stator. Consequently, the terminal portions are exposed to the exterior of the machine and accessible for suitable quick connection to a power source.

In order to prevent the entrance of moisture, dust, and other foreign matter into the frame interior through opening 64, a deformable, generally rectangular piece of resilient material 66 (e.g., rubber) is provided entirely over the opening in the manner shown in FIGS. 1 and 5. Preferably, piece 66, having suitable slits through which male terminals 56 extend, is held against the internal wall of the frame surrounding the opening by engagement with tangs 58 and edge 57 of the terminal assembly 50. With this arrangement, resilient piece 66 in effect urges assembly 50, including elements 52 and 53, away from the opening and augments the resistance of the assembly from being moved axially relative to the stator as external connectors are being disconnected from the male quick-connect terminal portions 56 of the respective elements. Piece 66 may be installed onto the terminal assembly 50 just prior to the mounting of the stator into the frame cavity and axial movement of the stator into its proper position will serve to deform the piece and provide the desired bias on the assembly.

It will be readily manifest from the above description and the drawing that the advantages and features of this invention are numerous. For instance, the terminal arrangement is compact, consisting of low cost parts, inexpensive to manufacture, and is easily installed on the stator of the motor without necessitating a structural change or an increase in size for either the stator or frame. Further, outside connections can be made swiftly and simply, such connections being possible both before and after the stator has been mounted within the frame to allow versatility in the testing procedure for the device. In addition, the terminal arrangement is securely provided relative to the winding to which it is electrically joined, the electrical union being adequately protected against injury during subsequent handling such as assembly of the stator with the other components of the machine.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A dynamoelectric machine comprising frame means having a cavity and an opening communicating between the cavity and the exterior of the frame means; a stator mounted within said cavity, said stator including a core formed of magnetic material having a plurality of angularly spaced apart slots, at least one winding accommodated in at least some of said slots; and a terminal assembly carried by said stator in the vicinity of the frame opening for connecting the winding to a power source externally of the machine, said terminal assembly comprising a member formed of electrical insulating material having a section attached to said stator and at least two terminal elements mounted on the insulating member with an end of each terminal element terminating in terminal portions extending beyond one edge of said insulating member; means attaching the windings and terminal elements electrically together; closure means disposed in said frame means in the vicinity of and closing said opening; said terminal portions projecting into said frame opening through and beyond said closure means thereby being exposed to the exterior of the frame means for connection in circuit with the power source, whereby said closure means tends to close the opening of the frame means, except for the exposed terminal portions, and to resist outward movement of said terminal assembly away from the core as the terminal portions are being connected and disconnected relative to the power source.

2. The dynamoelectric machine of claim 1 in which each terminal element has transverse tabs formed on the sides thereof adjacent said one edge of said insulating member with said tabs being bent into engagement therewith to resist relative angular movement between the individual terminal elements and the insulating member of the terminal assembly.

3. A dynamoelectric machine comprising a frame having a cavity and an opening communicating between the cavity and the exterior of the frame; a stator mounted within said cavity; said stator including a core formed of magnetic material having a plurality of angularly spaced apart slots, at least one winding accommodated in at least some of said slots and a terminal assembly carried by said stator in the vicinity of the frame opening for connecting the winding to a power source externally of the machine; said terminal assembly comprising a member formed of electrical insulating material having a section extending into one of the slots and at least two terminal elements mounted on the insulating member in non-engaging relation, means attaching the windings and terminal elements electrically together; means firmly attaching the insulating member to said stator, an end of each terminal element terminating in terminal portions extending beyond one edge of said insulating member and into the frame opening to expose said terminal portions to the exterior of the frame thereby permitting access thereto from outside the machine.

References Cited by the Examiner

UNITED STATES PATENTS

| 2,412,254 | 12/1946 | Edelman | 310—75 |
| 2,801,354 | 7/1957 | Donahoo | 310—71 |
| 2,802,958 | 8/1957 | Corley | 310—71 |
| 2,872,599 | 2/1959 | De Young | 310—71 |
| 2,982,873 | 5/1961 | Simmons et al. | 310—239 |
| 3,012,159 | 12/1961 | Druesedow | 310—71 |
| 3,089,047 | 5/1963 | Perzyk | 310—239 |

FOREIGN PATENTS 1,056,721  5/1959  Germany.

MILTON O. HIRSHFIELD, *Primary Examiner.*

J. D. MILLER, *Assistant Examiner.*